United States Patent [19]

Marshall

[11] 3,879,666

[45] Apr. 22, 1975

[54] CIRCUIT FOR ANTI-JAM RECEIVER OF WIDE DYNAMIC RANGE UTILIZING INSTANTANEOUS AUTOMATIC GAIN CONTROL ACTION FOR CLOSELY PACKED PULSES

[75] Inventor: Joseph F. Marshall, Woburn, Mass.

[73] Assignee: The United States of America as represented by the Secretary of the Navy, Washington, D.C.

[22] Filed: Feb. 15, 1963

[21] Appl. No.: 258,929

[52] U.S. Cl. ................ 325/404; 325/412; 343/18 E

[51] Int. Cl. ............................................ H04b 15/00

[58] Field of Search ........... 325/400, 404, 408, 412, 325/414, 478, 479, 473; 343/17.1, 18 E; 323/404

[56] References Cited

UNITED STATES PATENTS

| | | | |
|---|---|---|---|
| 2,215,946 | 9/1940 | Von Radinger | 325/473 |
| 2,532,347 | 12/1950 | Stodola | 343/17.1 |
| 2,961,532 | 11/1960 | Rowley | 325/17.1 |
| 3,262,057 | 7/1966 | Miller et al. | 325/400 |

*Primary Examiner*—Maynard R. Wilbur
*Assistant Examiner*—H. A. Birmiel
*Attorney, Agent, or Firm*—R. S. Sciascia; Paul S. Collignon

[57] ABSTRACT

A circuit for producing instantaneous automatic gain control of the intermediate stages for an anti-jam range receiver. A plurality of intermediate frequency amplifier stages, each having a pair of pentode tubes, are coupled in sequence by transformers. A sampling secondary winding is connected in flux relation with the primary winding of each transformer and a slow-varying back-biasing circuit is coupled to the sampling secondary winding. A voltage amplitude clipping diode is coupled to the control grid of each tube in each amplifier stage and a biasing voltage is coupled to the diodes to establish a clipping voltage level on each tube grid so that the tubes are back biased automatically for slowly varying continuous wave signals and instantaneously for rapid, high amplitude jam signals.

8 Claims, 5 Drawing Figures

Figure 1:
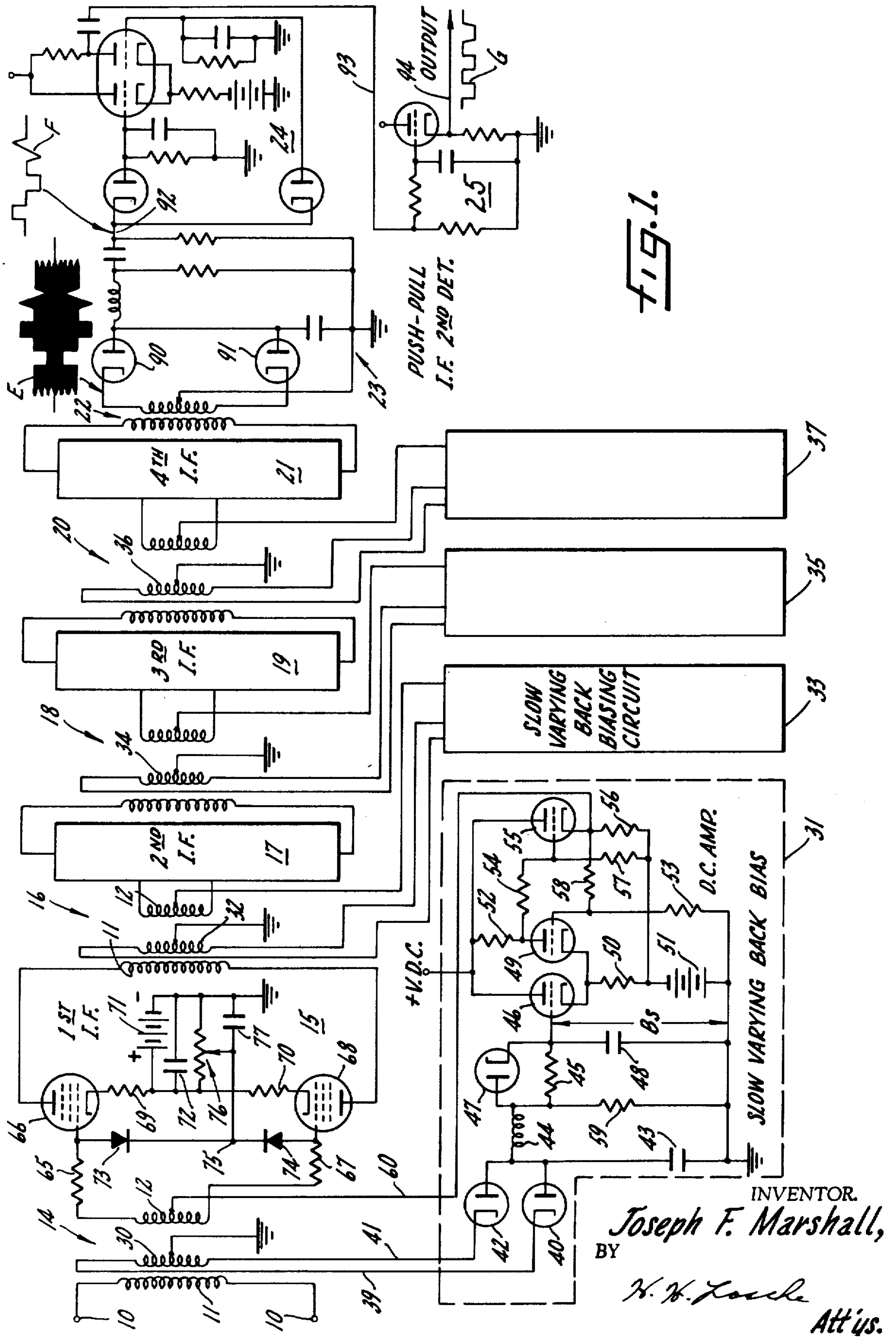

INVENTOR.
Joseph F. Marshall,
BY
H. W. Locke
Att'ys.

INVENTOR.
Joseph F. Marshall,
BY
H. H. Losche
Att'ys.

CIRCUIT FOR ANTI-JAM RECEIVER OF WIDE DYNAMIC RANGE UTILIZING INSTANTANEOUS AUTOMATIC GAIN CONTROL ACTION FOR CLOSELY PACKED PULSES

This invention relates to instantaneous automatic gain control circuits and more particularly to circuits for use in conjunction with the intermediate frequency stages and coupling transformers of a wide dynamic range radio frequency receiver to eliminate undesirable noise, clutter, or jamming interference signals from the desirable intermediate frequency and video target signal information conducted through the intermediate frequency stages of the receiver.

In the use of radio frequency receivers, such as radar receivers or the like, interference in the form of continuous wave (CW) noise, or amplitude modulated interference waves, are received which must be eliminated or minimized to provide an effective and useful system for target designation. It has been the general practice to utilize automatic gain control (AGC) or instantaneous automatic gain control (IAGC) circuits or loops coupled to the intermediate frequency (IF) amplifier stages to provide back bias on the IF amplifiers sufficient to preserve the incremental gain of the receiver for desired signals, while greatly reducing the response to the interfering signals. This back bias protects the IF amplifier stages from overload normally resulting from the wide dynamic range of input signals and the high gain of the IF amplifiers that would drive these amplifiers well above the level at which operation is linear. IAGC loops are used primarily where short duration, high amplitude CW interference signals are purposely directed to the receivers, commonly known as "jam" signals, to deceive the receiver. These IAGC loops are usually of a type to use sample signals from the second detector to produce and feed back the back biasing voltages to one or more IF amplifier stages to prevent overloading of the amplifier. IF amplifier overloading would cause serious pulse stretching or complete loss of desirable video signals and jamming of the receiver therefore would be accomplished. Disadvantages arise in providing IAGC loops to back bias more than one IF amplifier of a plurality of stages since the instability of the amplifier usually increases proportionately. It is also difficult to provide amplifier circuits in the IAGC loop capable of handling the bandwidth of up to 5 megacycles (MC) necessary to back bias a plurality of IF amplifier stages.

In the present invention an IAGC circuit is provided which can be used with one, two or more, or all of the IF amplifier stages without producing any instability and which operates in a very narrow bandwith of only 0.1 MC. This reduction in bandwidth from known IAGC circuits is made possible by the use of crystal clipping diodes in the grid circuits of the IF amplifiers in conjunction with narrow bandwidth direct current (D.C.) amplifiers in the slow varying back biasing circuit. Serious time delay match between an IF amplifier and video IAGC circuitry is thereby greatly reduced. Also high frequency video decoupling through power supplies and IF circuitry, due to the inherent stray capacity of components in circuit, are greatly alleviated. It is, therefore, a general object of this invention to provide an IAGC circuit including a crystal diode clipping network co-operating in conjunction with a slow varying back biasing circuit with a narrow bandwidth D.C. amplifier coupled to the IF amplifier circuits of a wide dynamic range receiver to eliminate short duration, high amplitude CW jamming or interfering signals without destroying target signals.

Figure 2:
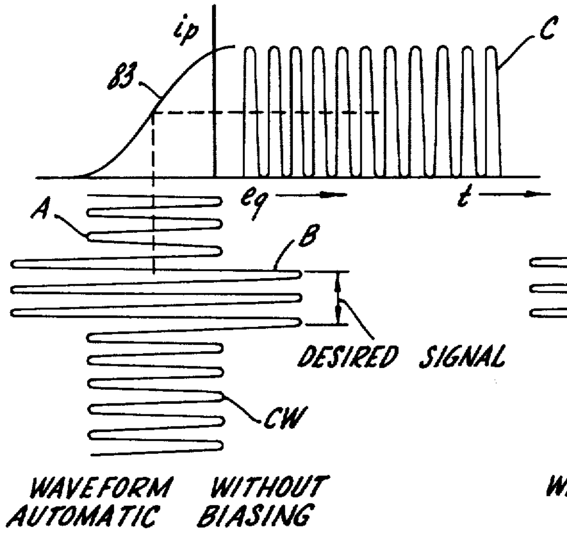
Figure 3:
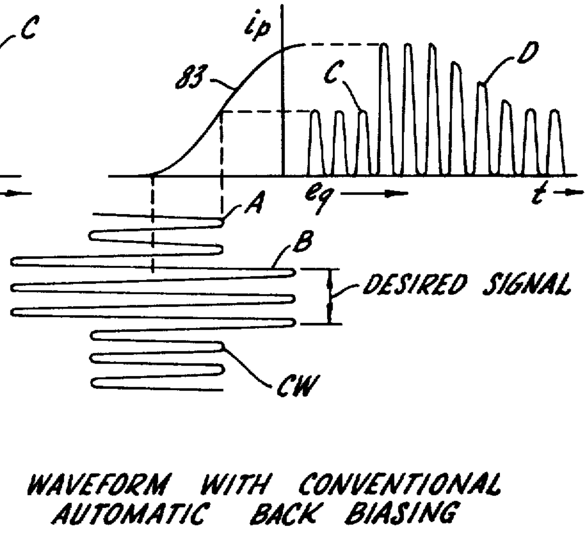
Figures 4, 5:
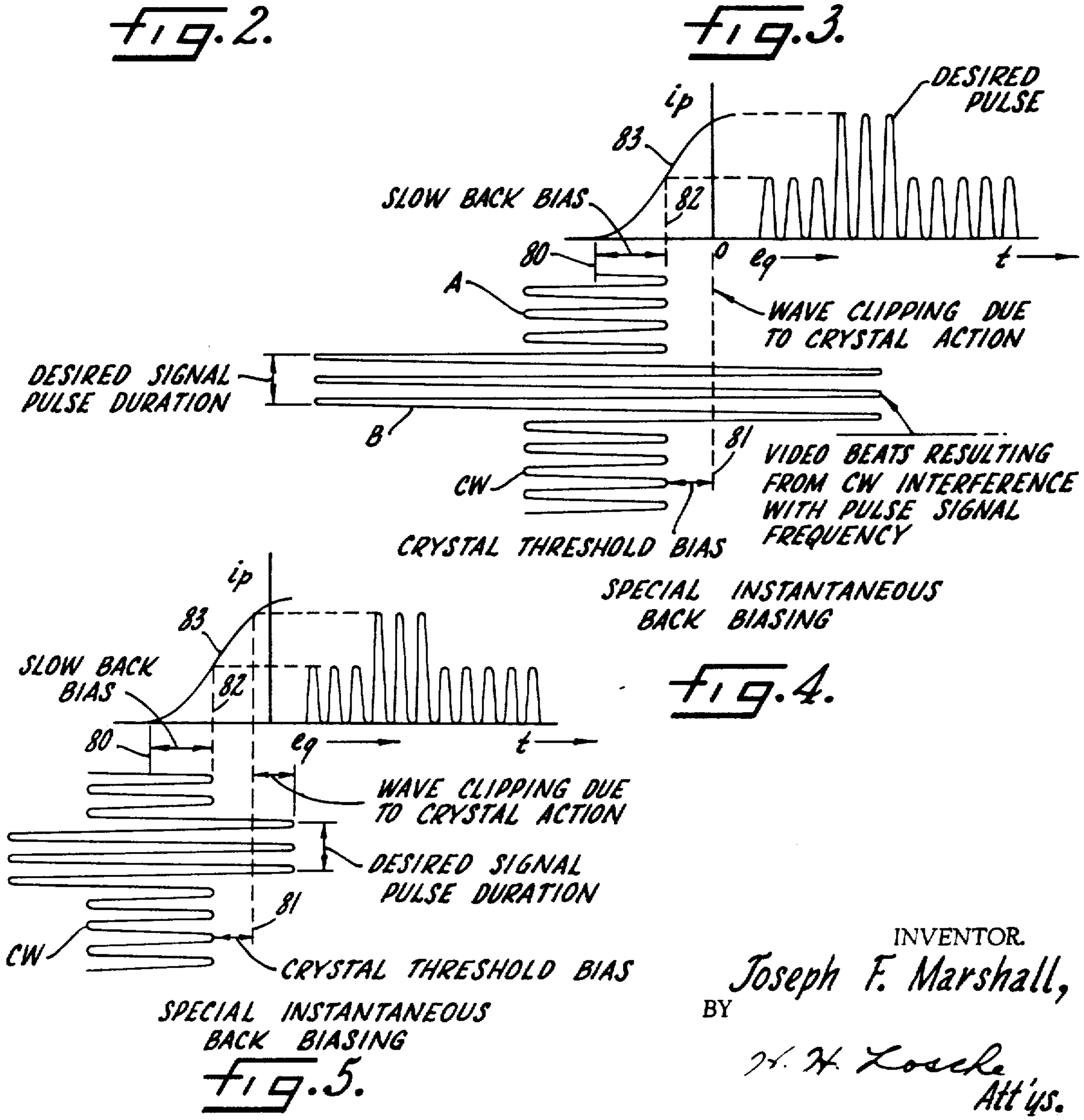

These and other objects and the attendant advantages, features, and uses will become more apparent to those skilled in the art when considered along with the accompanying drawings in which:

FIG. 1 is a partially schematic and partially block circuit diagram of the IAGC circuitry as incorporated with four IF stages of a receiver, FIG. 2 shows the IF waveforms of an IF amplifier without automatic biasing, FIG. 3 illustrates the IF waveforms of an IF amplifier for conventional automatic back biasing, and FIGS. 4 and 5 illustrate the IF waveforms of an IF amplifier having the special instantaneous back biasing circuits of this invention incorporated therein.

Referring more particularly to FIG. 1 of the drawings, an IF amplifier strip for a wide dynamic range receiver, such as a radar or the like, is shown utilizing four balanced push-pull subminiature pentode IF stages the gains of which are individually controlled to provide a progressive IAGC of the IF stages in accordance with this invention. In this Figure of drawing the input to the IF strip is applied at terminals 10 through the primary winding 11 of a coupling transformer 14 for the first IF stage 15. The secondary 12 of IF transformer 14 is center-tapped and supplies the input to the first IF stage 15. The succeeding second, third, and fourth IF stages 17, 19, and 21, respectively, are likewise coupled through coupling transformers 16, 18, and 20. The output of the fourth IF stage 21 is coupled by way of a coupling transformer 22 to a push-pull IF second detector 23, the output of which is through a restorer circuit 24 for restoring the positive and negative video pulses from the IF second detector yielding only single polarity pulses in the output through a cathode follower circuit 25. Each of the second, third, and fourth IF amplifier stages 17, 19, and 21, are identical in circuit structure with the first IF stage 15 and accordingly, only the first IF stage 15 is shown in circuit schematic.

In accordance with this invention, in each coupling transformer 14, 16, 18, and 20, is a sampling secondary winding 30, 32, 34, and 36 each of which is center-tapped to ground. The leads of each of the sampling secondary windings are coupled to slow varying back biasing circuits 31, 33, 35, and 37, respectively. Since the four slow varying back biasing circuits are identical, only the first slow varying back biasing circuit 31 is shown in circuit schematic within the dash lines in FIG. 1. Using the slow varying back biasing circuit 31 as an example for description purposes, the sampling secondary 30 has one lead 39 coupled to the cathode of a diode 40 and has the other lead 41 coupled to the cathode of a diode 42. The anodes of diodes 40 and 42 are coupled in common, this common coupling being related to ground potential through a capacitor 43. The common anode coupling of the diodes 40 and 42 is also coupled through an inductance coil 44 and a resistance 45 to the grid of a triode 46 in a D.C. amplifier circuit. The resistance 45 has a diode 47 coupled in parallel therewith, the anode of which is connected to the terminal coupling of the inductance 44 and resistance 45 and the cathode of which is coupled to the grid of the triode 46. The grid of triode 46 is coupled to ground through a capacitance 48, the resistance 45 and capacitance 48 constituting an integrating circuit. The triode 46 has its anode directly coupled to an anode voltage source and its cathode coupled in common with the cathode of a triode 49, this common coupling of the cathodes being cathode biased through a resistor 50 and a D.C. voltage source 51, the positive terminal of this voltage source being directly coupled to a fixed potential such as ground. The anode of the triode 49 is coupled through an anode resistor 52 and the grid is coupled through a grid biasing resistor 53 to ground potential. The anode of the triode 49 is resistance coupled through a resistor 54 to the grid of a cathode follower tube 55, the cathode of the latter being cathode loaded through a resistor 56 to the negative potential of the D.C. voltage source 51. The grid of the cathode follower tube 55 is grid biased through a resistor 57 to this same negative D.C. voltage source. The three tubes 46, 49, and 55 and their related circuitry provide the D.C. amplifier for the slow varying back biasing circuit, the two triodes 46 and 49 operating as a differential amplifier herein. While the triodes 46 and 49 are illustrated herein as separate triodes, it is to be understood that these triodes can be a single double triode tube, when desired. The grid of the triode 49 is coupled to the cathode of the cathode follower tube 55 through a resistance 58, the cathode of the cathode follower tube 55 providing the output by way of conductor 60 to the center tap of the secondary 12 in the IF coupling transformer 14. The diodes 40 and 42 in conjunction with the sampling secondary winding 30 center tapped to ground provide a push-pull circuit to develop negative voltage pulses at the common anode applied through the inductance 44 and resistance 45 to the grid of the first D.C. amplifier stage 46. These negative pulses are integrated by the resistor 45 and capacitor 48 to smooth the negative D.C. back biasing voltage signals applied to the grid of the triode 46, the diode 47 providing a fast decay time through a resistor 59 of the back biasing voltage by rapid discharge of the capacitor 48. This back biasing voltage, $B_s$, is developed across the grid of the triode 46 and ground potential which is amplified through the differential amplifier 46,49 and the cathode follower tube 55 to provide on the cathode output 60 a negative back biasing voltage to the center tap of the secondary 12 in the IF coupling transformer 14. The slow varying back biasing circuit 31 just described will vary slowly in accordance with the amplitude changes of the IF voltage applied to terminals 10 through the primary 11 to induce these IF voltages in the sampling secondary 30.

The secondary 12 of the IF coupling transformer 14 has one lead coupled through a coupling resistor 65 to the control grid of one pentode 66 of the first IF stage 15 while the other lead of secondary 12 is coupled through the coupling resistor 67 to the control grid of the pentode 68 of the first IF stage 15. The resistors 65 and 67 form the series equivalent of a shunt resistor across the secondary for obtaining prescribed wide bandwidth. The anodes of the pentodes 66 and 68 are coupled through the primary winding 11 of the IF coupling transformer 16, the secondary 12 of which is coupled to the second IF stage 17. The cathodes of the pentodes 66 and 68 are each coupled through cathode resistors 69 and 70, respectively, to the positive terminal of a D.C. voltage source 71, the negative terminal of which is directly coupled to ground potential. The D.C. voltage source 71 has a capacitor 72 coupled in parallel therewith to filter out A.C. voltages. The screen and suppressor grids are coupled in any well known manner to provide a completed IF stage but are not completed in the circuit herein since the connection of these grids are unnecessary in the description and understanding of this invention. The above described circuitry for the first IF stage 15 is of the usual type which may be recognized by those skilled in the art.

In accordance with this invention the above-described conventional IF stage, as illustrated by 15, is modified to provide an action corresponding to IAGC and thereby fulfilling all the requirements of an IAGC circuit. In accordance with this invention the control grids of the pentodes 66 and 68 are each coupled to the anode of corresponding crystal clipping diodes 73 and 74. The cathodes of the crystal clipping diodes 73 and 74 are coupled in common at terminal 75, this terminal being coupled to the adjustable tap of a potentiometer 76, the resistance element of which is connected across the terminals of the D.C. voltage source 71. The adjustable tap 76 establishes a threshold bias on the cathodes of the crystal clipping diodes 73 and 74. The adjustable tap of the potentiometer 76 is also coupled through a D.C. blocking capacitor 77 to ground potential. The adjustable tap of the potentiometer 76 is adjustable to set the threshold voltage on the cathodes of the diodes 73 and 74 such that, when this threshold is exceeded in either polarity applied to the grids of the pentodes 66 and 68, these high amplitude swings will be clipped off by way of the circuit through diodes 73 and 74 through the D.C. blocking capacitor 77 to ground. The feasibility of the arrangement and construction of the various parts as hereinabove described may best be understood by a statement of operation.

OPERATION

The operation of the IAGC action may best be understood by reference to FIG. 1 with occasional reference to FIGS. 2 through 5, as appropriate. FIG. 2 illustrates an input CW referenced by the character A in an IF amplifier stage where there is no automatic biasing. If the input wave A includes a portion of high amplitude, such as shown by B indicating desired signal information, the signal wave portion B will be entirely clipped off in the IF amplifier as shown by the output wave C by virtue of the wave portion B exceeding the tube characteristics causing grid circuit saturation. For further background information, FIG. 3 illustrates the input wave A having the desired signal information B thereon applied to a conventional automatic back biasing circuit for an IF amplifier which produces the output wave C with a stretched signal portion D. Stretching of the signal portion D is undesirable for proper target detection since the exact position of the target cannot be determined from such a stretched signal. When a signal, such as A as shown in FIG. 4, is applied to the terminals 10 in FIG. 1, the slow varying back biasing circuit 31 will back bias the control grids of the pentodes 66 and 68 in the first IF amplifier stage 15 as shown by the line 80 in FIG. 4. As the amplitude of the input signal A varies, the slow back biasing circuit 31 will vary the line 80 accordingly. In the presence of interference, the crystal clipping threshold biased back-to-back diodes will effectively ride superimposed upon the slowly varying back bias $B_s$, the magnitude of which ($B_s$) is determined by the intensity of CW, jamming, or rail jamming, and/or noise interference. If short duration high amplitude video signals in the one to 2.7 MC range are superimposed on the waveform A such as jamming signals, these will be induced in the secondary 12 of the coupling IF transformer 14 to be applied to the grids of the tubes 66 and 68 in the IF amplifier 15. However, the high amplitude of the jamming signals B will exceed the threshold voltage established by the adjustable tap of potentiometer 76 to establish a threshold voltage on the cathodes of the crystal clipping diodes 73 and 74 and these high amplitude short duration pulses will be clipped at the line 81 extended from the characteristics curve 83 as shown in FIG. 4. While FIG. 4 shows the threshold voltage as being between the lines 81 and 82, this threshold voltage may be adjusted so that the threshold bias 81, 82 may be pulled to the left as shown in FIG. 5 so that the clipping may take place over a more linear portion of the amplifier characteristics curve 83. Since the crystal clipping diodes 73 and 74 establish a clipping level, these diodes operate to produce a result similar to the IAGC circuits, this action being so instantaneous that the bandwidth is reduced to only 0.1 MC whereas other well known IAGC circuits must operate within a bandwidth of zero to 5 megacycles. Likewise, the D.C. C. amplifier in slow slow varying back biasing circuit 31 may be of a very narrow bandwidth of only zero to 0.1 MC to accomplish instantaneously IAGC action in conjunction with the crystal clipping diodes 73 and 74 in the first IF amplifier stage 15.

While slow varying back biasing circuits 31, 33, 35, and 37 are illustrated in FIG. 1 as being coupled to each of the corresponding IF coupled transformers 14, 16, 18, and 20, respectively, it is to be understood that under certain applications and circumstances it may be found unnecessary to utilize such a slow back biasing circuit with each and every IF coupling transformer of an IF strip. Accordingly, one or more of the slow back biasing circuits as shown within dash lines 31 may be used with as many of the IF amplifier stages as deemed necessary. Likewise, the crystal clipping diodes 73 and 74 may be used with one, two, three or all of the IF amplifiers as deemed appropriate or necessary. The fourth IF stage 21 is coupled through the transformer 22 to the second detector 23 which may establish a voltage envelope as illustrated by the envelope E applied to the cathodes of diodes 90 and 91 in the second detector. The second detector 23 is push-pull providing on its output 92 the negative video voltage waveform F being applied to the restorer circuit 24. The restorer circuit 24 restores the positive or negative video pulses applied at 92 from the second detector to yield only single polarity pulses on its output conductor 93 to the cathode follower circuit 25. The output 94 of the cathode follower circuit 25 thereby produces the video voltage pulses G of one polarity which is desirable for subsequent circuitry of the radar or other receiver circuits.

While many modifications and changes may be made in the constructional details and features of this invention to adapt the circuitry to various types of receivers without departing from the spirit and scope of the invention herein, I desire to be limited only by the scope of the appended claims.

I claim:

1. A circuit producing instantaneous automatic gain control of the intermediate frequency stages for an anti-jam, wide dynamic range receiver comprising:

a plurality of intermediate frequency amplifier stages coupled in sequence by coupling transformers, each transformer having a primary output from the preceding stage and a center tapped secondary with the leads thereof coupled to the grids of amplifier tubes in the succeeding stage;

a sampling secondary winding in flux relation with said primary;

a slow varying back biasing circuit coupled to said sampling secondary winding and having an output coupled to said secondary center tap for back biasing the grids of said amplifier tubes;

a voltage amplitude clipping means coupled to said tube grids; and a threshold biasing voltage coupled to said voltage amplitude clipping means to establish the clipping voltage level on said tube grids whereby the intermediate frequency amplifier tubes are back biased automatically for slowly varying continuous wave signals and instantaneously for rapid, high amplitude jam signals.

2. A circuit as set forth in claim 1 wherein said voltage amplitude clipping means comprises a diode coupled to the grid of each tube, said diodes each having one of its electrodes coupled to said grid and the other of its electrodes coupled in common to said threshold biasing voltage.

3. A circuit as set forth in claim 2 wherein said threshold biasing voltage is adjustable through a potentiometer.

4. A circuit producing instantaneous automatic gain control of the intermediate frequency stages for an anti-jam, wide dynamic range receiver comprising:

a plurality of intermediate frequency amplifier stages coupled in sequence by coupling transformers, each coupling transformer having a primary winding output from the preceding stage and a center tapped secondary winding for the succeeding stage, the leads of said center tapped secondary winding each being coupled to the grid of an amplifier tube in the succeeding stage to provide push-pull amplification of intermediate frequency and video signals;

a sampling secondary winding in flux relation with said primary winding;

a slow varying back biasing circuit having an input coupled to said sampling secondary winding and having an output coupled to said center tap of said secondary winding for the succeeding stage for back biasing the grids of said amplifier tubes in normal amplitude ranges of the intermediate frequency and video signals;

a pair of diodes, each having the anode thereof coupled to the grid of one of said amplifier tubes in the succeeding stage and having the cathodes thereof coupled in common; and a threshold biasing voltage source coupled across a potentiometer, the adjustable tap of which is coupled to said common cathode coupling to adjustably vary the threshold voltage of said diodes and coupled through a direct current blocking capacitor to a fixed potential to effect clipping of video voltage amplitudes of clutter and jamming proportions above threshold adjusted voltage values in each of selected intermediate frequency stages.

5. A circuit as set forth in claim 4 wherein said slow varying back biasing circuit has its input coupled through diode means to filter networks, said filter networks being coupled through a low impedance direct current augmented cathode follower amplifier, the output of which is said output coupled to said center tap of said secondary winding.

6. A circuit as set forth in claim 5 wherein said sampling secondary winding is center tapped to a fixed voltage and said diode means are a pair of diodes with the cathode of one each coupled to one each of said sampling secondary winding leads and with the anodes thereof coupled in common to said filter network.

7. A circuit producing instantaneous automatic gain control of the intermediate frequency stages for an anti-jam, wide dynamic range receiver comprising:

a plurality of intermediate frequency amplifier stages coupled in sequence by coupling transformers between an input circuit of intermediate frequency and a second detector of a receiver, each coupling transformer between the input circuit to the first intermediate frequency amplifier and between intermediate frequency amplifier stages having a primary winding output and a center tapped secondary winding as an input to the next succeeding stage, the leads of said center tapped secondary winding each being coupled to the grid of a pair of amplifier tubes to provide push-pull amplification of intermediate frequency and video signals;

a sampling secondary winding in flux relation with one of said primary windings, said sampling winding being center tapped to a fixed potential;

a slow varying back biasing circuit including a pair of diodes having their cathodes coupled respectively to the leads of said sampling secondary winding and their anodes coupled in common through a filter network and a low impedance direct current cathode follower amplifier to the center tap of said secondary winding associated with said coupling transformer including said one of said primary windings;

a second pair of diodes, each having an anode coupled to the grid of each amplifier tube, respectively, and having the cathodes thereof coupled in common;

a threshold biasing voltage source coupled across a potentiometer, the adjustable tap of which is coupled to said common cathode coupling of said second pair of diodes to adjustably vary the threshold voltage of said second pair of diodes and which is coupled through a direct current blocking capacitor to a fixed potential to clip intermediate frequency and video signals of amplitudes above the adjusted threshold voltage, said sampling secondary, said slow back biasing circuit, and said second pair of diodes and threshold biasing voltage being applied to the number of said plurality of intermediate frequency amplifier stages as desired, whereby clutter and jamming signal voltages are clipped without removing the video signals of target designation in the receiver.

8. A circuit as set forth in claim 7 wherein said threshold biasing voltage source has a capacitor coupled in parallel therewith and the cathodes of said second pair of amplifier tubes are biased from said threshold biasing voltage source through biasing resistance.

* * * * *